United States Patent
Che

[15] 3,660,244
[45] May 2, 1972

| [54] | FERMENTATION APPARATUS |
|---|---|
| [72] | Inventor: Chi-Sin Che, Ponca City, Okla. |
| [73] | Assignee: Continental Oil Company, Ponca City, Okla. |
| [22] | Filed: Aug. 14, 1969 |
| [21] | Appl. No.: 850,124 |

[52] U.S. Cl. ..............................195/143, 195/142, 259/107, 259/96
[51] Int. Cl. .......................................................C12b 1/10
[58] Field of Search ....................195/143, 142; 259/107, 96

[56] References Cited

UNITED STATES PATENTS 2,491,656  12/1949  Goldman ..............................259/107
3,236,744  2/1966  Yamaha ................................195/143
3,460,810  8/1969  Mueller .................................259/96
2,997,424  8/1961  Mayer ...................................195/143

*Primary Examiner*—Alvin E. Tanenholtz
*Attorney*—Joseph C. Kotarski, Henry H. Huth, Jerry B. Peterson, Glen M. Burdick and Carroll Palmer

[57] ABSTRACT

A fermentation apparatus is provided having a reactor vessel, baffle means, impellor means, and a telescopeable draft tube means which enables the upper portion of the draft tube means to be raised and lowered with respect to the lower portion of the draft tube means.

7 Claims, 2 Drawing Figures

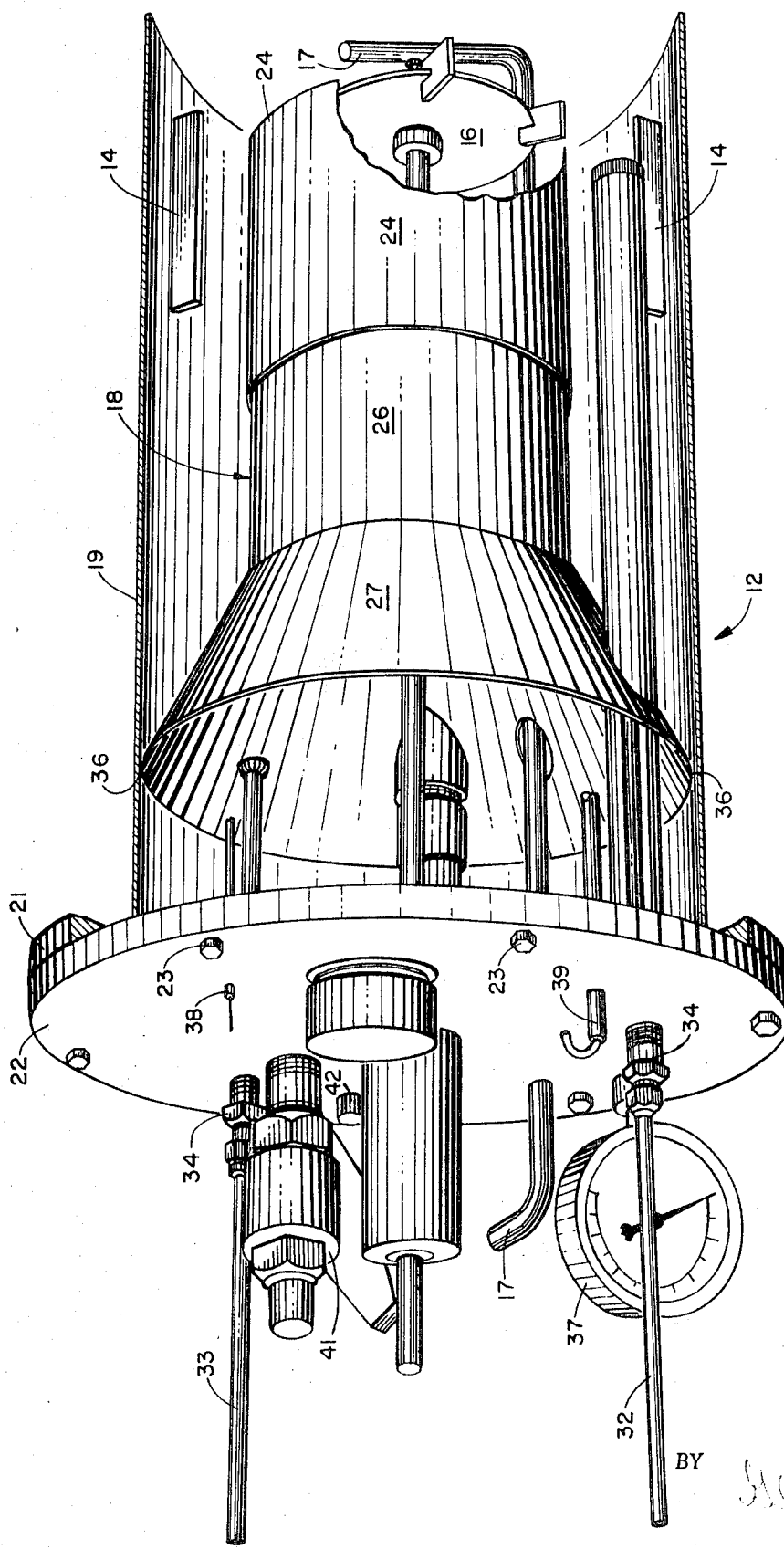

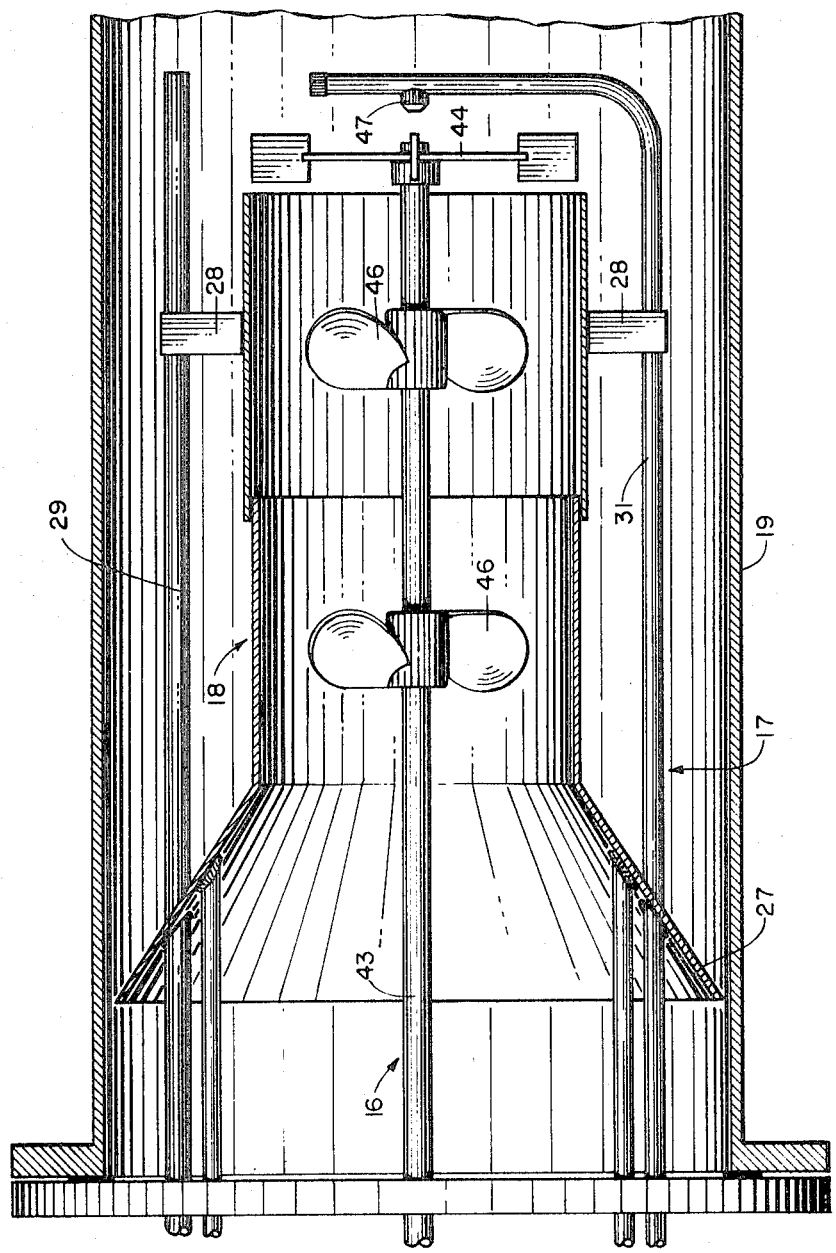

3,660,244

FERMENTATION APPARATUS

BACKGROUND OF THE INVENTION

1. Field of the Invention

This invention relates to a fermentation apparatus. In one aspect this invention relates to a novel fermentation apparatus having a telescopeable draft tube means.

2. Brief Description of the Prior Art

Fermentation involves the growth of microorganisms on nutrient substances to produce cells and/or biochemicals. Considerable attention has recently been focused on the feasibility of employing microorganisms to convert petroleum hydrocarbons into sources of food protein for animal and human consumption. Under optimum growth conditions, many organisms can utilize hydrocarbon and inorganic materials to produce cellular protein. The hydrocarbon is oxidized to provide the energy and carbon for cellular synthesis. This process takes place efficiently in a well controlled fermentation environment.

Many conventional fermenters have been described in the literature. However, these fermenters are often operated at relatively high agitation speed in efforts to promote sufficient mixing and nutrient transfer in order to accomplish good microbial growth and metabolism. This procedure often results in a serious foam problem. These difficulties are especially severe during hydrocarbon fermentation.

Cells produced during the fermentation have strong affinity for the hydrocarbon and thus they localize in the hydrocarbon layer and/or at the aqueous hydrocarbon interface. The carbon dioxide respired from the cells is trapped in the hydrocarbon-cell mixture along with foaming agents such as protein or surface active substances that are produced during the fermentation.

In order to provide an ideal fermentation system it is desirable to have the nutrient substances in the smallest possible particle size (greater surface area) and to have the particles well distributed in the medium to provide the organisms an adequate supply of carbon and inorganic chemicals as well as other essential nutrients that might be required. In addition, the foaming problem in the fermentation process should be eliminated or reduced to a minimum since foaming increases the probability for fermenter contamination, adversely affects the mixing system, decreases oxygen transfer and tends to encourage segregation of the nutrient substances. Further, from an economical point of view, the power required to operate the fermenter should be kept at a minimum.

While the problems discussed above occur in many fermentation processes these problems are extremely significant in hydrocarbon fermentation processes. Thus, new types of fermenters are constantly being sought which will eliminate the segregation, mixing and foaming problems prevelant in the fermenters of the prior art and which are economical to operate, maintain, and construct.

OBJECTS OF THE INVENTION

An object of the present invention is to provide an improved fermentation apparatus. Another object of the invention is to provide an improved fermentation apparatus which eliminates or reduces to a minimum the segregation, mixing and foaming problems which are common in fermentation processes.

These and other objects of the invention will become apparent to those skilled in the art upon studying this disclosure, the appended claims, and the drawing, in which:

FIG. 1 is a schematic representation of the fermentation apparatus according to this invention; and FIG. 2 is a cross-sectional view of the fermentation apparatus of the present invention illustrating the telescopeable draft tube means of the fermentation apparatus in more detail.

DETAILED DESCRIPTION OF THE INVENTION

The invention will now be explained with reference to the drawing. FIG. 1 depicts a fermentation apparatus having a reactor vessel means 12, a plurality of substantially vertically disposed baffle means 14 which are positioned about the lower interior of reactor vessel means 11, and impellor means 16 for effecting circulation of the fluid contents of reactor vessel means 12, means 17 for introducing a gas below impellor means 16, and a telescopeable draft tube means 18. Reaction vessel means 12 is provided with a reaction chamber 19 which is closed at one end and has an outwardly extending flange member 21 secured to the other end, and a cover means 22 which cooperates with flange member 21 to form a fluid tight seal. Lock means are employed to securely fasten flange member 21 of reaction chamber 19 and cover means 22 together. Any suitable lock means can be employed such as bolt members 23 which are positioned within aligned apertures (not shown) in cover means 22 and flange member 21 and then secured by nut member (not shown). Since the operating conditions in fermenters are relatively mild (temperatures rarely exceed 120° C and a pressure of 15 lb/in$^2$, and these conditions are possibly incurred for only a short time during sterilization) and only in a few cases does the pH value lie outside the range of 5 to 10, any suitable material such as stainless steel, aluminum, copper, zinc and the like and alloys containing them can be employed to construct the fermentation apparatus.

Telescopeable draft tube means 18 is positioned within reaction chamber 19 and comprises a plurality of concentric telescopeable hollow cylindrical surfaces of which the uppermost of said surfaces is flared outwardly at its upper end. More specifically, telescopeable draft tube means 18 is provided with a first cylindrical tubular member 24 adapted to telescopicly receive a second cylindrical tubular member 26 which has a conical member 27 attached to its outwardly extending end portion. First cylindrical tubular member 24 is secured in a relatively fixed position with respect to reaction chamber 19 by any suitable means, such as flange members 28 which are secured to the outer surface of first cylindrical tubular member 24 at one end and to conduits 29 and 31 at the other end (see FIG. 2) so that second cylindrical tubular member 26 and thus conical member 27 can be raised or lowered with respect to first cylindrical tubular member 24 by any suitable adjusting means, such as rod members 32 and 33.

Rod members 32 and 33 are secured at one end to conical member 24 by any suitable means, such as welding, and the outwardly extending end portions of said rod members are slideably positioned within apertures (not shown) in cover means 22 so that the outwardly extending end portions of rod members 32 and 33 extend above cover means 22. Since it is desirable that a fluid tight seal be formed around rod members 32 and 33 and cover means 22 when the fermentation apparatus is in operation, suitable securing means, such as nut members 34 are employed to secure said rod members to the cover means. When it is desirable to raise or lower conical member 27 and thus second cylindrical tubular member 26 with respect to first cylindrical tubular member 24 the securing means are loosened and rod members 32 and 33 are manipulated to position conical member 27 and second cylindrical tubular member 26 as desired.

Telescopeable draft tube means 18 is positioned within reaction chamber 19 and the upper-outer surface of conical member 27 cooperates with the inner surface of reaction chamber 19 to define annular passageway 36. The size of annular passageway 36 is important because it is desirable that the liquid flow in said passageway be restricted a determined amount in order to eliminate and/or prevent any "dead spots" at the air-liquid interface. Thus, the size of annular passageway 36 is represented by the formula $P \cong D_f/33$ where $D_f$ is the interior diameter of reaction chamber 19.

Cover means 22 is further provided with reaction monitoring means which communicate with the reaction fluid within reaction chamber 19 such as pressure sensing means 37, temperature sensing means 38, pH sensing means 39 and pressure control means 41. In addition, an injection port means 42 and means 17 are provided for inducing materials into reaction chamber 19. For example, pH controlling materials can be injected into the reaction chamber during the fermentation process without interrupting the operation of the fermentation apparatus. The above mentioned reaction monitoring means are affixed to cover means 22 so as to provide fluid tight seals. Pressure sensing means can be any suitable means such as a pressure gauge or a transducer. Likewise, temperature sensing means 38, pH sensing means 39 and pressure control means 41 can be any suitable means such as a thermometer or thermocouple, a reference electrode, and a pressure control valve respectively.

Referring now to FIG. 2 impellor means 16 and means 17 will be discussed in more detail. Impellor means 16 is provided with a vertical shaft means 43 which extends through cover means 22 and is mounted within cover means 22 in a fluid tight manner while, at the same time, allowing vertical shaft means 43 to be freely rotated by a motor means which is attached to the outwardly extended end portion of vertical shaft means 43. The other end portion of vertical shaft means 43 extends through cover means 22 and telescopeable draft tube means 18. Shaft means 43 is positioned so as to be concentric with telescopeable draft tube means 18 and is provided with turbine means 44 below the lower end of telescopeable draft tube means 18. Propeller means 46 are affixed to vertical shaft means 43 at positions intermediate with the lower and upper ends of telescopeable draft tube means 18. While it is evident that the number of propeller means can vary, desirable results have been obtained wherein two propeller means have been employed.

Means 17 is a conduit 31 passing through and sealed in a fluid tight manner with cover means 18 and is utilized to inject gas into reaction chamber 19. The lower portion of conduit 31 extends downwardly through an opening in conical member 27 of telescopeable draft tube means 18 and the lower end portion of conduit 31 contains a sparger means 47 which is positioned below turbine means 44 of impellor means 16.

The operation of the fermentation apparatus of the present invention will now be discussed in a batch type hydrocarbon fermentation process. However, as previously mentioned, the apparatus can be employed for either a continuous or batch-type operation. The fermentation liquid is placed within reaction chamber 19 and impellor means 16 is started so that the fermentation liquid is being thoroughly agitated. Telescopeable draft tube means 18 is then adjusted by way of rod members 32 and 33 so that the upper portion of conical member 27 is just below the surface of the circulating fermentation liquid. An oxygen-containing fluid, such as air, is then injected in a continuous stream through means 17 in order to allow the fermentation process to proceed. Due to the downward driving action of propeller means 46 of impellor means 16 the fermentation fluid passes through the center portion of telescopeable draft tube means 18 until it contacts turbine means 44 of impellor means 16 where the shearing action of turbine means 44 causes the droplets to become smaller in particle size. In addition, turbine means 44 shears air bubbles coming from sparger means 47 positioned immediately below. Thus, the air saturated liquid will always contact the sheared substrate droplets. The liquid flow then is forced around the outer portion of telescopeable draft tube means 18 and turbulence is further increased through the use of baffle means 14. As the reaction fluid rises toward the top of the fermenter there is a tendency for segregation of the substrate droplets and the problem of segregation is lessened by the presence of baffle means 14 positioned at the lower portion of reaction chamber 19. The reaction fluid then continues upwardly on the outside of telescopeable draft tube means 18 until the reaction fluid flows over the upwardly extended lip portion of conical member 27 of telescopeable draft tube means 18 where gravitational force will pull the fluid to the center of telescopeable draft tube means 18 for succeeding "cycling" circulation. Angular passageway 36, formed by reaction chamber 19 and the upwardly extending edge portion of conical member 27 of telescopeable draft tube means 18 is important in that it greatly restricts the liquid flow thus eliminating any "dead spots" at the air-liquid interface. If the liquid level expands during heavy cell growth the upper portion of telescopeable draft tube means 18 is raised to maintain the proper circulation and proper mixing pattern.

The fermenter described above meets the requirements of an ideal fermentation apparatus. While the fermenter is not limited to hydrocarbon fermentation it is especially suitable for hydrocarbon fermentation in that the hydrocarbon droplets are constantly sheared by the turbine means and the small droplets immediately contact the air saturated aqueous phase. Further, the foaming problem is greatly reduced because cell-hydrocarbon masses are constantly broken up by the mechanical shearing thus carbon dioxide is not trapped in the cell-hydrocarbon mixture.

While particular embodiments of the invention have been described, it will be understood that the invention is not limited thereto since many modifications may be made; and it is, therefore, contemplated to cover by the appended claims any such modification that falls within the true spirit and scope of the invention.

Having thus described the invention, I claim:

1. A fermenter comprising:
   a. a reactor vessel means having a reaction chamber, a cover means, and lock means cooperating with said reaction chamber and said cover means to form a fluid tight seal between same;
   b. a plurality of substantially vertically disposed baffle means disposed about the lower interior of said vessel means;
   c. impellor means oriented within said vessel means for effecting circulation of fluid contents thereof;
   d. means for introducing a gas below said impellor means; and
   e. draft tube means within said reaction chamber, said draft tube means comprising a first cylindrical tubular member affixed within a lower portion of said reaction chamber, a second cylindrical tubular member adapted to be vertically adjusted with respect to said first cylindrical tubular member, a conical member attached to the upper portion of said second cylindrical tubular member, and a plurality of rod members secured to said conical member and slidably extending through said cover means thus allowing said second cylindrical tubular member and said conical member to be raised and lowered with respect to said first cylindrical tubular means.

2. The device of claim 1 wherein said upward end of said conical member and the inner wall of said reaction chamber define an annular passageway of width represented by the formula $$P \cong D_f/33$$

where $D_f$ is the interior diameter of said reaction chamber.

3. The device of claim 2 wherein said impellor means comprises a vertical shaft means extending through said draft tube means, said shaft means being concentric with said draft tube means and provided with turbine means below the lower end of said draft tube means and propeller means intermediate the lower and upper ends of said draft tube means.

4. The device of claim 3 wherein said means for introducing a gas comprises a conduit connected at one end to a source of oxygen-containing gas and passing through and sealed to said cover means, and extending thence through an opening in the uppermost surface of said draft tube means and downward until it is positioned below said impellor means, and having an opening below said impellor means.

5. The device of claim 4 which includes an injection conduit for introducing materials during the operation of said fermenter.

6. The device of claim 5 which includes feed inlet and product outlet conduit means for operating said fermenter in a continuous manner.

7. The device of claim 6 which includes pressure means, temperature measuring means, and pH measuring means communicating with the interior portion of said reaction chamber to continuously monitor the reaction in said reaction chamber.

* * * * *